Figure 2:
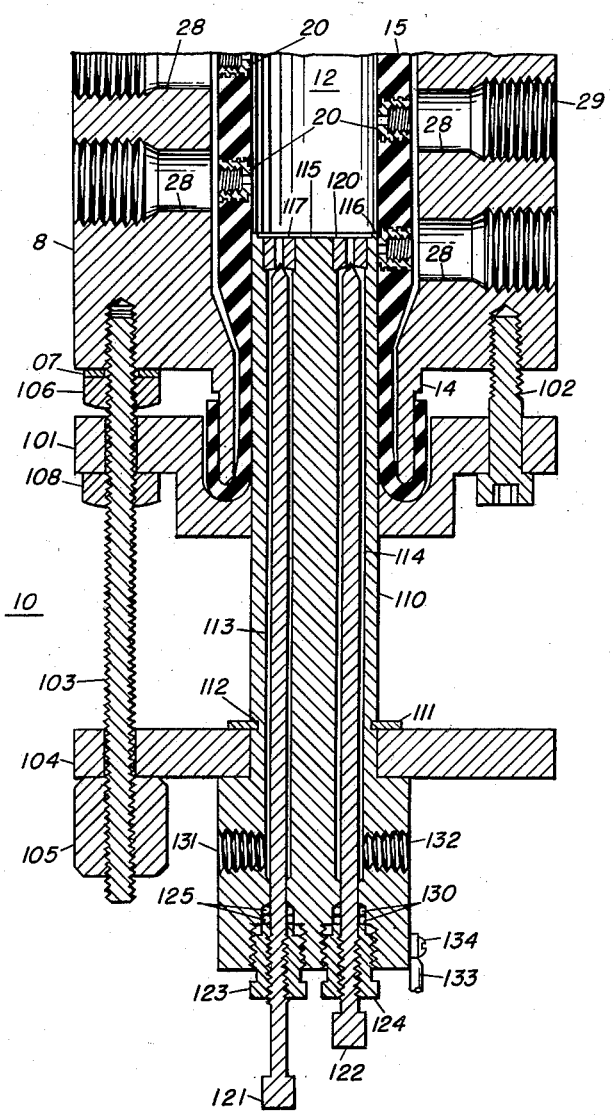

MARION L. SLUSSER
DOUGLAS K. McLEAN
HARRY A. BARCLAY
INVENTORS

BY Frederick E. Dumoulin
ATTORNEY

Jan. 28, 1958 M. L. SLUSSER ET AL 2,821,680
APPARATUS FOR USE IN DETERMINING CHARACTERISTICS
OF POROUS MATERIAL
Filed April 12, 1956 4 Sheets-Sheet 2

MARION L. SLUSSER
DOUGLAS K. McLEAN
HARRY A. BARCLAY
INVENTORS

BY Frederick E. Dumoulin
ATTORNEY

Jan. 28, 1958 M. L. SLUSSER ET AL 2,821,680
APPARATUS FOR USE IN DETERMINING CHARACTERISTICS
OF POROUS MATERIAL
Filed April 12, 1956 4 Sheets-Sheet 3

MARION L. SLUSSER
DOUGLAS K. McLEAN
HARRY A. BARCLAY
INVENTORS

BY Frederick E. Dumoulin
ATTORNEY

Jan. 28, 1958 M. L. SLUSSER ET AL 2,821,680
APPARATUS FOR USE IN DETERMINING CHARACTERISTICS
OF POROUS MATERIAL

Filed April 12, 1956 4 Sheets-Sheet 4

MARION L. SLUSSER
DOUGLAS K. McLEAN
HARRY A. BARCLAY
INVENTORS

BY Frederick E. Dumoulin
ATTORNEY

United States Patent Office 2,821,680
Patented Jan. 28, 1958

2,821,680

APPARATUS FOR USE IN DETERMINING CHARACTERISTICS OF POROUS MATERIAL

Marion L. Slusser, Douglas K. McLean, and Harry A. Barclay, Dallas, Tex., assignors, by mesne assignments, to Socony Mobil Oil Company, Inc., New York, N. Y., a corporation of New York Application April 12, 1956, Serial No. 577,764

14 Claims. (Cl. 324—13)

This invention relates to apparatus for measuring characteristics of porous materials and relates more particularly to apparatus used in measuring variations in characteristics of core samples obtained from subterranean formations.

In the drilling of an oil or gas well, core samples are taken from the earth strata through which the well is drilled and various characteristics of the samples are determined for the purpose of establishing the lithologic structure of the strata, estimating the quantity of oil or gas in the strata, the ease of flow of the oil or gas through the strata, etc. Such core samples are also taken from the producing strata and the characteristics of the samples are determined for the purpose of developing improved drilling techniques and remedial practices directed towards minimization of contamination of the formation surrounding the well bore.

Among the characteristics of core samples determined for the above purposes are permeability and electrical resistivity.

Permeability of a core sample is the ability of the formation from which the core was taken to transmit fluids. The permeability of a core sample is determined by forcing a fluid, the permeability to which the core sample is being tested, through the core sample, the core sample having previously been saturated with the same fluid, and measuring the rate of flow of fluid through the core sample. Permeability is expressed in terms of the viscosity of the fluid, the pressure drop of the fluid passing through the core sample, and the length and the cross-sectional area of the core sample.

Electrical resistivity of a core sample is a function of the fluid saturation of the core sample. The measurement of electrical resistivity involves the passing of a known electrical current through a core sample and determining the resulting potential drop. Electrical resistivity is expressed in terms of the measured resistance between electrodes, the cross-sectional area of the core sample, and the distance between the electrodes employed in measuring the resistance.

For most of the above purposes single values for the permeability and electrical resistivity of a core sample are satisfactory. However, it is desirable to have knowledge of the permeability and electrical resistivity for specific portions of a core sample in those instances where it is desired to improve drilling techniques and to reduce contamination of the strata around the bore hole. This is particularly true in the field of rotary drilling where drilling fluids are utilized to cool the drilling bit, carry the cuttings from the hole, and maintain a pressure head upon the formation which is being drilled. The drilling fluids utilized in rotary drilling generally penetrate into and remain within the formation around the bore hole resulting in damage to the formation which is detrimental to the production of a well in that there is a detrimental effect upon the fluid flow capacity of the oil zone immediately surrounding the bore hole. Development of remedial practices to minimize this damage is dependent in part upon knowledge of the distance the drilling fluids damage penetrates the formation and the extent of that damage. Thus, it can readily be seen that an overall permeability value is of limited significance unless the damage done extends uniformly throughout the entire length of the core sample taken from the damaged formation.

Various apparatus and methods have been employed for the purpose of measuring the variations in permeability and electrical resistivity along the length of a core sample. Some of the practices employed have required the sealing of a dry core sample in a cell by means of thermosetting plastics, lead, and other materials, and the provision of ports or openings in the cell through the sealing material along the length of the sample. Other practices have involved alternately sawing thin sections from the damaged zone of the core sample and measuring the permeability of the remainder of the sample. This stepwise procedure is continued until the measured permeability of the remainder of the sample is equal to that of the original undamaged sample. Both of these approaches to the problem are unsatisfactory in that they are tedious, time-consuming, and, most important, the sample is rendered useless for further studies. The thermosetting plastics or other materials used for sealing the sample are not readily removable and those samples which have been cut into thin sections may not be reassembled such that they have the characteristics of the original sample.

It is an object of this invention to provide apparatus for use in determining characteristics of porous materials. It is another object of this invention to provide a holder for a core sample during the determination of characteristics of the core sample. It is another object of this invention to provide a holder for a core sample during the determination of the permeability and during the determination of the electrical resistivity of a core sample. It is another object of this invention to provide a holder for a core sample during the determination of differences in the permeability and differences in the electrical resistivity along the length of a core sample. It is another object of this invention to provide an apparatus used in the determination of characteristics of a core sample whereby the core sample may be studied without the employment of special mounting procedure for the sample. It is another object of this invention to provide an apparatus to be used in the determination of characteristics of a core sample whereby the core sample remains undamaged and may be utilized for further studies. These and other objects of this invention will become apparent from the following description thereof.

In accordance with our invention, we provide a test cell which utilizes a flexible, electrically insulating sleeve, provided with a plurality of contact elements, to seal the side wall of a core sample in order to permit, simultaneously or separately, a determination of (1) the differences in permeability along a porous sample for a fluid and (2) the electrical resistivity differences along the porous sample by measurement of the pressures in the flowing phase and the electrical potential at known points along the length of the sample.

Figure 1:
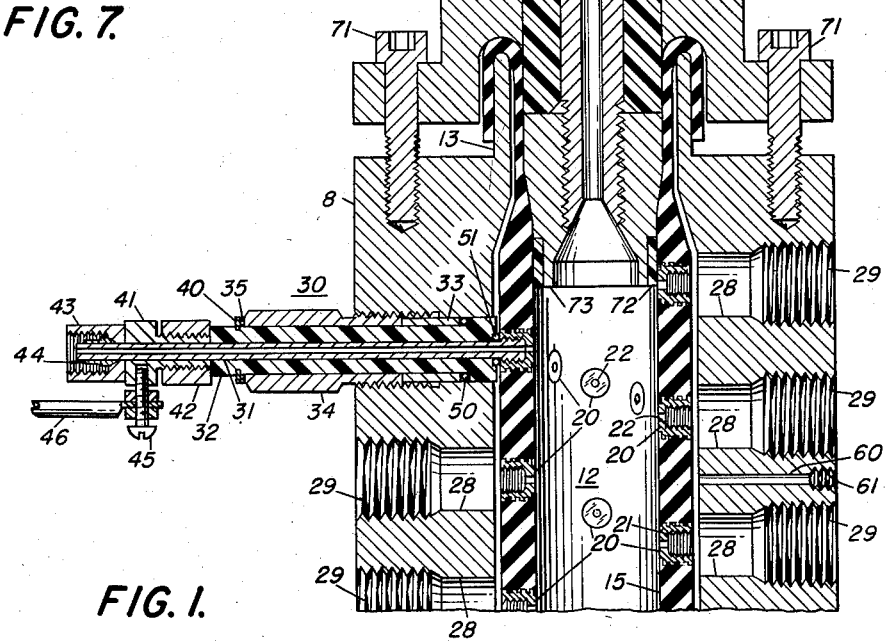
Figure 3:
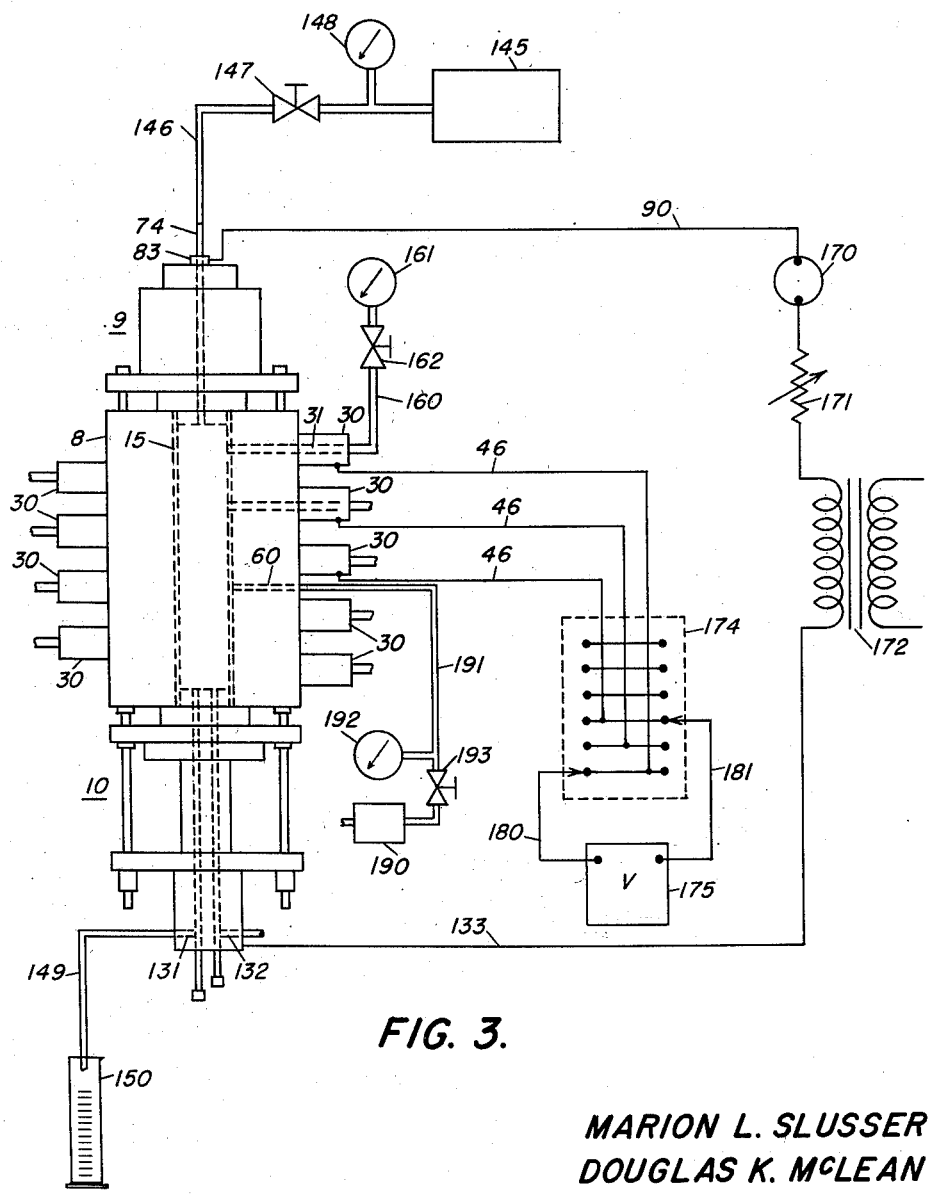

In the drawings, Fig. 1 is a view in cross section of one end of apparatus embodying the invention, showing one of several pressure-potential taps. Fig. 2 is a cross-sectional view of the other end of apparatus embodying the invention. Fig. 3 is a schematic diagram of one manner of connecting the apparatus of Figs. 1 and 2 to pressure and electrical potential measuring means.

Figure 6:
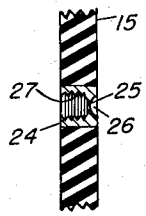
Figure 7:
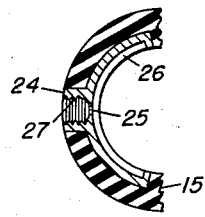
Figure 4:
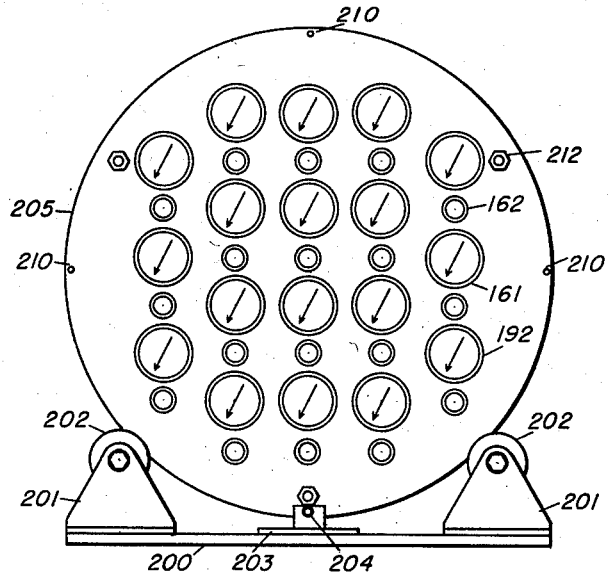
Figure 5:
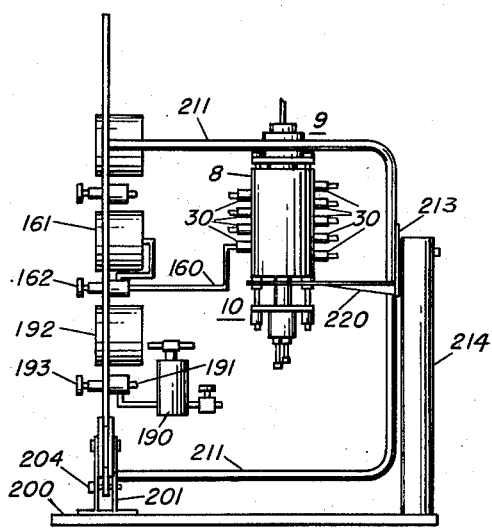

Fig. 4 is a front view in elevation of a form of mounting which may be used with the apparatus of Figs. 1 and 2. Fig. 5 is a side view in elevation of the mounting illustrated in Fig. 4, showing the apparatus of Figs. 1 and 2 as it is secured to the mounting. Fig. 6 is a vertical cross-section of a portion of the flexible sleeve illustrating another form of contact element which may be employed. Fig. 7 is a horizontal cross-section of a portion of the flexible sleeve and contact element shown in Fig. 6.

Referring to the drawings, Figs. 1 and 2 illustrate one embodiment of a core sample test cell constructed in accordance with the invention. The core sample test cell, hereinafter referred to as the cell, comprises body 8, closure assembly 9, and closure assembly 10. Body 8 is provided with core sample chamber 12 and shoulders 13 and 14 which are formed integral with the body and extend outwardly from the ends of the body. Sleeve 15, composed of flexible, impervious, electrically insulating material, such as rubber, is positioned within chamber 12 around the walls thereof and extends over shoulders 13 and 14. The sleeve is desirably spaced apart slightly from the walls of the chamber to facilitate the introduction of a core sample into the chamber. The sleeve is provided with a plurality of contact elements 20 which are secured through the walls of the sleeve to furnish pressure ports through the sleeve at selected points along the portion of its length which lies within chamber 12. Each of elements 20 is provided with internal threads 21 and with an aperture 22 to permit fluid communication through the element into chamber 12. Each element has a concave inward face to permit optimum contact with a cylindrical core sample positioned within chamber 12. The degree of concavity applied to the inward faces of the elements will, of course, depend upon the diameter of the core samples for which the cell is designed.

Element 20, as shown in Figs. 1 and 2, is cylindrical in shape. The area of effective contact of element 20 with a core sample is determined by the cross-sectional area of aperture 22. Another form of contact element which may be employed is illustrated in Figs. 6 and 7. Referring to these figures, contact element 24 is provided with aperture 25 which connects with channel 26 positioned in the inner face of the arcuate portion of the contact element along the inner wall of sleeve 15. Threads 27 are provided in contact element 24 to permit the connection of a pressure-potential tap 30. The use of contact element 24 permits a greatly increased area of communication with a core sample as compared with the area provided when contact element 20 is employed. It will be recognized, of course, that the dimensions of channel 26 determine the effective area of communication which is available when using element 24.

Generally speaking, where single phase flow through a core sample is being studied, a sleeve fitted with contact elements 20 will be employed, while in multiple phase flow studies the use of a sleeve containing contact elements 24 is desirable.

The number of contact elements and the positions of the elements in sleeve 15 may be varied as desired. The distances between the various contact elements along the length of the sleeve and the number of contact elements utilized determine the number and thickness of the segments of a core sample for which data may be obtained. In a specific embodiment of the invention, 17 contact elements 20 were positioned in a spiral configuration around the sleeve over the length of the portion of the sleeve within chamber 12 to provide longitudinal spacing along the sleeve varying from one-eighth inch to one-half inch.

Body 8 is provided with a plurality of radial bores 28 which extend through the wall of the body. Each of bores 28 is provided with internal threads 29. The positions and number of bores 28 are dependent upon the positions and number of contact elements in the sleeve, there being a bore 28 coincident with each contact element.

A pressure and electrical potential tap, generally designated by reference numeral 30, is secured by means of threads 29 in each of bores 28. Tap 30 comprises tube 31, sleeve 32, collar 33, spanner nut 34, washer 35, ring 40, screw 41, nut 42, nut 43, sleeve 44, and set screw 45. Electrical current lead 46 is secured to tap 30 by screw 45. O-ring seal 50 is positioned around sleeve 32 to prevent leakage from chamber 12 between the wall of the chamber and sleeve 15 outwardly around sleeves 32 and 33. O-ring seal 51 is positioned around tube 31 to prevent leakage from chamber 12 around tube 31. Spanner nut 34 functions to secure tap 30 in bore 28 by engagement with threads 29. Tube 31 engages threads 21 in contact element 20 to permit fluid communication between tube 31, aperture 22 in contact element 20, and chamber 12. Sleeve 32 is formed of a rigid, electrically insulating material in order that tube 31 will be electrically insulated from body 8 and spanner nut 34 to permit completion of an electric circuit with a core sample positioned within chamber 12 through contact element 20 and tube 31.

Body 8 is provided with a radial conduit 60 extending through a wall of the body into chamber 12. Opening 60 is provided with threads 61 to permit the connection of a pressure-vacuum source to chamber 12 between the outer wall of sleeve 15 and the walls of the chamber in order that sleeve 15 may be urged into sealed relationship with the wall of a core sample positioned in chamber 12 within sleeve 15.

A first closure assembly 9 is secured to one end of body 8 by means of a plurality of bolts 71. Assembly 9 serves to seal the one end of sample chamber 12, to provide fluid conduit means into chamber 12, and to provide means for an electric current to flow through the end of the cell into a core sample positioned in chamber 12. Assembly 9 comprises electrically insulating sleeve 72 around a portion of member 73, tube 74, electrically insulating sleeve 75, nut 80, gland 81, electrically insulating washer 82, nut 83, screw 84, and nuts 85 and 86. Electrical current lead 90 is secured on screw 84 between nuts 85 and 86. Sleeves 72 and 75 and washer 82 may be formed of any substantially rigid, impermeable, and non-absorbent material having electrical insulating qualities, such as nylon. Member 73 is preferably soldered or welded to tube 74 to prevent leakage. Gland 81 is held by bolts 71 to body 8 with sufficient force to secure the upper end of the sleeve 15 between shoulder 13 and the gland and prevent leakage from chamber 12 between the gland, sleeve 15, and shoulder 13. Member 73 and sleeve 75 fit within sleeve 15, and when the cell is in operation, the force of a pressure medium within chamber 12 around sleeve 15 maintains sleeve 15 in sealed relationship with member 73 and sleeves 72 and 75. Sleeves 15 and 75 and washer 82 provide the necessary electrical insulation to permit flow of electric current from current lead 90 through nut 83 and tube 74 to member 73 and thence into an end of a core sample in contact with member 73. Tube 74 may be utilized as either an inlet to or an outlet from chamber 12.

Member 73 is positioned such that the end adjacent to chamber 12 is substantially in alignment with the axis of a contact element 20 to permit pressure and electrical potential measurements to be made at an end of a core sample within chamber 12. Sleeve 72 serves to insulate electrically member 73 from the contact element which is in alignment with the end of member 73.

As shown in Fig. 2, secured to the other end of body 8 is a second closure assembly 10 which functions to seal the other end of chamber 12, to provide a longitudinally adjustable support for a core sample in chamber 12, to provide fluid conduits into the chamber, and to permit electrical connection to an end of a core sample in chamber 12. Flange 101 is secured to body 8 by a plurality of bolts 102 and 103. In Fig. 2, bolts 102 and 103 are shown out of true position for simplicity of illustration. This embodiment of the invention utilizes two bolts 103 and two bolts 102, each being spaced 180° apart, respectively, around flange 101. If more than two bolts 102 and 103 are used, they should be equally spaced about the flange. Flange 101 is drawn up sufficiently tightly by bolts 102 and 103 to effect a sealed relationship between sleeve 15 and shoulder 14 to prevent leakage between the sleeve and shoulder from chamber 12. Flange 104 is supported on the bolts 103 by means of nuts 105. Nuts 106 and washers 107 are positioned on bolts 103 and are tightened to lock nuts 103 in body 8. Nuts 108 are provided on bolts 103 to support flange 101. Bolts 103 are threaded over their entire length to permit vertical adjustment of flange 104. Plug 110 extends through flanges 101 and 104 into chamber 12 within sleeve 15 and is secured to flange 104 by spring-type C ring 111 which fits in groove 112 cut into the periphery of plug 110. The plug, at the end within chamber 12, is adapted to contact and support an end of a core sample within chamber 12. By adjustment of nuts 105 on bolts 103, flange 104 and the plug may be moved vertically as desired in order that core samples of various lengths may be accommodated within chamber 12. To prevent leakage from chamber 12 around the plug a sealed relationship between the plug and sleeve 15 is effected by a pressure medium maintained around sleeve 15 which urges the sleeve against the plug.

Channels 113 and 114 are provided throughout the length of plug 110 to permit flow through the plug to or from chamber 12. Face 115 is countersunk in plug 110 so that the face will be spaced apart from an end of a core sample in contact with plug 110. Countersinking of face 115 provides a peripheral rim 116 around plug 110. A disc shaped screen, not shown, may be placed against face 115 to provide mechanical support for the end of a core sample resting against rim 116 and to permit even distribution of liquids over the end of the core sample. Needle valve seats 117 and 120 are positioned in channels 113 and 114 with ends flush with face 115. The valve seats are preferably pressed into position and soldered or welded to prevent leakage. Needles 121 and 122 extend into channels 113 and 114, respectively, to co-act with valve seats 117 and 120 to permit control of flow through the channels. The diameter of the needles and the diameter of the channels are so related that there may be flow through the channels around the needles. Nuts 123 and 124 support needles 121 and 122, respectively, in channels 113 and 114. The needles may be adjusted vertically in order to vary the relationship between the ends of the needles and the needle valve seats 117 and 120 to control flow through the channels. Gaskets 125 and 130 are provided around needles 121 and 122 to prevent leakage through the channels around the needles. These gaskets are formed of rubber in the shape of O-rings, but they may be formed of any other satisfactory material and in any other satisfactory shape. Radial openings 131 and 132 in plug 110 extend into channels 113 and 114, respectively, to permit flow to or from the channels. Openings 131 and 132 are threaded to permit the making of tubing or pipe connections to the plug. Electrical current lead 133 is secured to plug 110 by means of screw 134.

One manner of connecting the cell to pressure and electrical potential measuring means is shown in Fig. 3, where a source of fluid under pressure 145 is connected to tube 74 by means of line 146, which contains valve 147 and pressure gauge 148. Line 149 is connected between opening 131 and fluid measuring device 150, which may be a graduated burette or any other suitable type of fluid measuring device.

Line 160 is connected between tube 31 in tap 30 and gauge 161 and contains valve 162. For purposes of simplicity of illustration, only one tap 30 is shown connected to a gauge 161. When the cell is being used to make electrical resistivity measurements, line 160 should be formed of electrically non-conducting material. Each tap 30 is similarly connected to its own individual pressure gauge, thus providing means for simultaneously measuring the pressure of fluid flowing through a core sample sealed in the test cell at as many points along the core sample as there are taps 30 in the test cell. Gauges 161 and lines 160 are filled with the fluid which forms the flowing phase through the sample. From consideration of capillary pressure the pressure recorded on gauges 161 will be that of the flowing phase. For example, if the permeability of the sample to oil is being determined, gauges 161 and lines 160 will be filled with oil. If permeability to water is being determined, the gauges and lines will be filled with water.

Current lead 90 is connected from tube 74 on assembly 9 through ammeter 170 and current adjusting resistor 171 to one side of the primary of transformer 172, and current lead 133 is connected from the other side of the primary of transformer 172 to plug 110. The secondary of transformer 172, which transformer is of the voltage type, is connected to any suitable source of alternating current, preferably 60 cycle. The current passed through lead 90 is preferably alternating, as direct current causes the formation of gas with the introduction of additional resistance in the circuit at the points where the current passes into and from a core sample.

Each of pressure-potential taps 30 is connected by means of a lead 46 to multiple position switch 174. For purposes of simplicity of illustration, only three taps 30 are shown connected to leads 46. Voltmeter 175 is connected to switch 174 by leads 180 and 181. Switch 174 may be any suitable type of multiple position switch which will permit the connection of voltmeter 175 to any selected pair of leads 46 in order that a determination may be made of the electrical potential difference between selected pairs of taps 30. Voltmeter 175 is preferably one having an impedance sufficiently high compared to the core sample that substantially no current flows through leads 180 and 181 so that the voltage drop appearing between leads 180 and 181 will be truly indicative of the resistance of the segment of the core sample between the taps to which the leads 46 are connected. Voltmeter 175 may be a vacuum tube voltmeter or any other suitable type having the desired impedance.

The preferred embodiment of the electrical measuring system as described above is known as the four electrode method. The four electrode method essentially comprises the use of electrical potential leads separate from the current leads and the use of a high impedance voltmeter connected to the potential leads to insure that substantially no current flows through the potential leads. It will be recognized, however, that other electrical measuring circuits may be employed, such as the two electrode method. The two electrode method utilizes common current and potential leads. The problem presented in the two electrode method, however, is that it is extremely difficult to eliminate the electrical resistance between the contact elements and a core sample and, consequently, the voltage drop indicated in the two electrode method will not always be truly indicative of the resistance of the segment of the core sample being measured.

Pressure-vacuum pump 190 is connected to conduit 60 in body 8 by means of line 191 which is provided with a gauge 192 and valve 193. Pump 190 may be any suitable type of pump which is capable of producing either a vacuum or a positive pressure as needed during the operation of the cell. The pump may be a hand operated single piston pump in which the piston is secured to a threaded rod or stem which is rotated by means of a hand wheel connected to the rod or stem.

A preferred form of mounting the cell is shown in Figs. 4 and 5. Base 200 is provided with brackets 201 which are secured to the base in any suitable manner such as by bolting. Sheaves 202 are rotatably mounted in brackets 201. Brackets 201 are positioned such that the sheaves will lie in a common plane with their axis of rotation parallel to each other. A locking device comprising bracket 203 and pin 204 is secured to base 200 between brackets 201 and in the plane which is common to the sheaves. Circular gauge panel 205 rests on sheaves 202 in order that the panel may be supported and will be free to be rotated to any desired position. The outer edge of panel 205 passes through bracket 203 to permit the panel to be locked in the desired position. Panel 205 is constructed of any suitable material, such as metal plate. Panel 205 is provided with a plurality of holes 210 positioned near the outer periphery of the panel to permit the panel to be locked in various positions of rotation by insertion of pin 204 through one of holes 210. Gauges 161, valves 162, gauge 192, and valve 193 are all mounted in panel 205, facing what will be referred to as the front of the panel as shown in Fig. 4, in order that the valves may be operated and the gauges observed from the front of the panel. A plurality of L-shaped spokes 211 are secured at one end to the panel by nuts 212 and extend from the back of the panel. The other ends of spokes 211 are secured to a plate 213 which, in turn, is rotatably mounted on post 214. Post 214 is fixed to base 200 behind panel 205 and in a position which will place the axis of rotation of plate 213 midway between and parallel to the axes of rotation of sheaves 202. Bracket 220 is secured to plate 213 and extends from the plate toward panel 205 to serve as a means of support for the cell.

Bracket 220 is conveniently connected to the cell adjacent to flange 101 by bolts 102 and 103, which as previously described, also function to secure closure assembly 10 to body 8 of the cell. In Fig. 5, for purposes of simplicity of illustration, only one of taps 30 is shown connected to one of gauges 161 by means of a line 160 which runs from the tap through valve 162 to the gauge. Pressure-vacuum pump 190 may be secured to the back of panel 205, as shown in Fig. 5, and connected to the cell by means of line 191. Fluid source 145 and line 146 and the electrical measuring apparatus are not normally secured to the gauge panel. They may be connected to the cell when it is in the desired position of rotation, or line 146 and the electrical leads may be made of a flexible material and of sufficient length to permit rotation of the cell while connected. With the cell connected, as just described, to the various respective valves and gauges which are positioned on the gauge panel and to the electrical leads, it can readily be seen that the panel and cell may be rotated to any desired position without disconnecting the lines and leads.

When it is desired to test a core sample damaged by invasion of drilling fluids, the only preparation of the core sample required is the cutting of it to the proper physical dimensions to permit it to be inserted into chamber 12 within sleeve 15. The core sample is cut into the shape of a right cylinder having a diameter approximately equal to that of the inside of sleeve 15 and a length which will permit it to be accommodated within chamber 12. The core sample is inserted into the cell in the following manner. Tube 74 and its associated parts, sleeve 72, member 73, sleeve 75, nut 80, washer 82, and nut 83 are all removed as a unit by rotating nut 80. Sleeve 15 is retracted slightly toward the walls of chamber 12 by (1) rotation of spanner nuts 34 in taps 30 causing contact elements 20 to be pulled outwardly, and (2) creating a slight vacuum between sleeve 15 and the walls of chamber 12 by means of pump 190. Care must be taken in moving taps 30 outwardly so that the contact elements will not be pulled from the sleeve and the sleeve will not wrinkle between the contact elements. Such retraction of sleeve 15 serves to make it easier to insert the core sample into chamber 12.

With sleeve 15 thus retracted the core sample is inserted into chamber 12 within the sleeve until one face of the core sample is resting on rim 116 of plug 110. Tube 74, and its associated parts are replaced in closure assembly 9. Plug 110 is then adjusted vertically by nuts 105 until each end face of the core sample is in contact with its respective closure assembly. Care must be taken to insure that the best contact possible is obtained between the faces of the core sample and member 73 and rim 116 as these are the only contacts with the core sample which permit the passing of the required electrical current through the core sample for the making of the electrical resistivity measurements. With the core sample in position and the plug tightened, spanner nuts 34 on taps 30 are rotated to move the contact elements into contact with the side wall of the core sample. Sleeve 15 is then forced into contact with the side wall of the core sample by imposing a fluid pressure from pump 190 through line 191 into opening 60. The fluid contained within pump 190, line 191, and the space around the sleeve may be oil. It is important to observe the sequence of (1) moving the contact elements into contact with the core sample and (2) imposing fluid pressure around the sleeve. Reversal of this sequence of imposing fluid pressure around the sleeve prior to the moving of the contact elements into contact with the side wall of the core sample may result in tearing the contact elements from the sleeve. With the sleeve thus forced against the side wall of the core sample, the core sample is completely sealed along said wall, thus preventing the by-passing of any fluid from the sample along these walls.

There is a possibility that after the core sample is in testing position within the cell, gas or air may be trapped between face 115 on plug 110 and the face of the core sample against which rim 116 is seated. This gas or air may be removed by rotating the core sample until closure assembly 10 is in an upward position, opening channels 113 and 114 by manipulation of needles 121 and 122, and passing oil into opening 132. The oil will move through channel 114, across the end of the core sample between the end of the core sample and face 115, and out through channel 113 and opening 131. Any gas or air present will be carried out of chamber 12 with the oil flow.

With the gas or air thus removed, the cell may, if desired, be rotated until closure assembly 10 is in a downward position. Channel 114 is closed by operation of needle 122 and an opening 131 is connected to a suitable fluid measuring device 150 by means of line 149. Fluid flow is started from source 145 through line 146, through the core sample, and out through line 149 into measuring device 150. The rate of flow of the fluid through the core sample may be determined by observing the time required for a given amount of fluid to collect in measuring device 150. With the fluid to which the permeability of the core sample is to be measured passing through the sample, the pressure of the fluid within the core sample at the points of taps 30 along the length of the core sample will be indicated by gauges 161. Thus, the various pressures of the fluid within the core sample at a plurality of points along its entire length will be indicated simultaneously. In view of the difficulty of reading a number of gauges simultaneously, it has been found convenient to photograph the entire gauge panel at the time it is desired to take a reading. In this manner, all of the gauges may be read at exactly the same moment and the data may be preserved for future use.

The pressure drop over selected segments of the core sample may be determined by comparison of the gauge readings for the taps which define the segments or segment of the core sample in question. A pressure profile for the entire core sample illustrating the pressure differences over its entire length may be readily constructed by plotting the pressure observed at each tap versus the distance of the tap from an end of the sample. Knowing the pressure drop through each defined segment of the core sample, the rate of flow of the fluid, the cross-sectional area and the length of each segment, and the viscosity of the fluid, the permeability of the segment of the core sample may be calculated using customary formulas.

In order to determine the electrical resistivity of the various segments of the core sample, a current of a fixed value is caused to flow through the core sample by connecting transformer 172 to a power source and adjusting resistor 171 until the desired current flow is observed on ammeter 170. The electrical potential difference for any selected segment of the core sample is determined by adjusting switch 174 to connect the taps 30 defining the segment to voltmeter 175 and observing the reading on the voltmeter. Thus, knowing the current flowing through the core sample and the voltage drop across the segment in question, the resistance of the segment may be readily calculated by applying Ohms law. The resistivity of the segment may be readily calculated by multiplying the resistance of the segment in ohms by its cross-sectional area divided by its length.

It will be recognized that the cell may be employed for determining the permeability of a core sample to various fluids, such as water and oil. Also, the cell may be utilized to study multiple phase flow through a core sample, such as the flow of water and oil simultaneously. In the latter instance, those taps which will measure oil pressure will have their associated lines 160 and the gauges 161 filled with oil, and those taps which will measure water will have a semi-permeable diaphragm installed in tube 31 of taps 30 and the associated lines 160 and gauges 161 will be filled with water along with the saturation of the diaphragm with water. Another manner of studying multiple phase flow involves the use of contact elements 24. This may be accomplished by employing a sleeve 15 into which are secured contact elements 24, as shown in Figs. 6 and 7. A core sample will be encased along its side wall by a semi-permeable diaphragm and the sample is inserted into the cell as previously described. After moving contact elements 24 against the side wall of the sample, the diaphragm in which the sample is encased may be pierced at those taps 30 which are to measure oil pressure. It is not necessary that a diaphragm be used in the measurement of oil pressure and, consequently, it is desirable that the diaphragm be pierced in order to provide more efficient fluid flow at these taps. The piercing of the diaphragm may be accomplished by insertion of a sharp instrument through tube 31 in tap 30. The diaphragm will not, of course, be pierced at those taps which are to measure water pressure.

In using the cell for the purpose of studying multiple phase flow, it will be necessary that the end of the cell as defined by closure assembly 10 be employed as the inlet. Either opening 131 or 132 may be utilized to introduce oil into the sample while the other opening is used for the introduction of the water into the sample.

The cell may be rotated to any desired position and fluids may be introduced into either end of the cell depending upon the demands of the measurements being carried out. When both water and oil phases are present in the effluent from the cell, downward flow is usually desirable. This permits separation of the effluent fluids by gravity, thus preventing an accumulation of water at the surface of the sample as would occur if the flow were in an upward direction.

It has been previously stated that a core sample may be inserted into the cell in the state in which it is removed from a formation, with consideration being given only to the cutting of the sample to the required dimensions. While this is true with respect to those samples which are to be examined in their state as removed from a formation, it can readily be recognized that the measurements being carried out will dictate the required preparation of the core. For example, some permeability measurements may require treating of the core to remove oil or other liquid material contained therein. This treating may be accomplished by extracting the core with a suitable solvent such as acetone, benzene, toluene, etc., in a Soxhlet extractor or other suitable type of apparatus. Following the extraction, the core sample is thoroughly dried of all solvent as, for example, by heating in a drying oven at about 100° C. The core sample is then saturated with the liquid to which the permeability of the core sample is to be determined and the core sample is inserted into the cell.

While the cell has herein been described as principally applicable to the measurement of permeability and resistivity of damaged core samples, it will be readily recognized by those skilled in the art that the cell may be employed for measurement of numerous other characteristics on both damaged and undamaged core samples.

Having thus described our invention, it will be understood that such description has been given by way of illustration and example and not by way of limitation, reference for the latter purpose being had to the appended claims.

We claim:

1. In apparatus of the character described, a flexible sleeve adapted to seal the side wall of a sample of porous material, and a plurality of contact elements secured through the wall of said sleeve to permit communication through said wall at selected points along the length of said sleeve, each of said contact elements being cylindrical in form and provided with an aperture and a concave inner face.

2. In apparatus of the character described, a flexible sleeve adapted to seal the side wall of a sample of porous material, and a plurality of contact elements secured through the side wall of said sleeve to permit communication through said wall at selected points along the length of said sleeve, each of said contact elements having an arcuate portion provided with a channel extending around a segment of the inner wall of said sleeve and a port connecting with said channel and opening through the outer wall of said sleeve.

3. Apparatus of the character described comprising a body provided with a chamber open at two opposite ends and adapted to hold a sample of porous material, a flexible sleeve within said chamber and extending over the ends of said body, a plurality of contact elements secured through the wall of said sleeve to permit communication through said wall at selected points along the length of said sleeve, closure means secured to said body at each of said ends of said chamber, each of said closure means being provided with at least one conduit opening into said chamber, means providing a conduit through a wall of said body to permit the imposition of a fluid pressure between the outer wall of said sleeve and the walls of said chamber, and a plurality of taps secured through the walls of said body to said contact elements.

4. Apparatus of the character described comprising a body provided with a chamber open at two opposite ends and adapted to hold a sample of porous material, a flexible sleeve within said chamber and extending over the ends of said body, a plurality of contact elements secured through the wall of said sleeve to permit communication through said wall at selected points along the length of said sleeve, each of said contact elements being cylindrical in form and provided with an aperture and a concave inner face, closure means secured to said body at each of said ends of said chamber, each of said closure means being provided with at least one conduit opening into said chamber, means providing a conduit through a wall of said body to permit the imposition of a fluid pressure between the outer wall of said sleeve and the walls of said chamber, and a plurality of taps secured through the walls of said body to said contact elements.

5. Apparatus of the character described comprising a body provided with a chamber open at two opposite ends and adapted to hold a sample of porous material, a flexible sleeve within said chamber and extending over the ends of said body, a plurality of contact elements secured through the wall of said sleeve to permit communication through said wall at selected points along the length of said sleeve, each of said contact elements having an arcuate portion provided with a channel extending around a segment of the inner wall of said sleeve and a port connecting with said channel and opening through the outer wall of said sleeve, closure means secured to said body at each of said ends of said chamber, each of said closure means being provided with at least one conduit opening into said chamber, means providing a conduit through a wall of said body to permit the imposition of a fluid pressure between the outer wall of said sleeve and the walls of said chamber, and a plurality of taps secured through the walls of said body to said contact elements.

6. Apparatus of the character described comprising a body provided with a chamber adapted to hold a sample of porous material and having a conduit leading to the inner wall of said chamber, said chamber being open at two opposite ends, a flexible sleeve positioned within said chamber and extending over the ends of said body, a plurality of contact elements secured through the wall of said sleeve to permit communication through said wall at selected points along the length of said sleeve, a plurality of pressure-potential taps secured through the walls of said body to said contact elements, each of said taps having an electrically insulated conduit leading to a contact element, a first closure member secured to said body at one end of said chamber, said first closure member having means providing at least one electrically insulated conduit into said chamber, and a second closure member secured to said body at the other end of said chamber, said second closure member having means providing at least one conduit into said chamber.

7. Apparatus of the character described comprising a body provided with a chamber adapted to hold a sample of porous material and having a conduit leading to the inner wall of said chamber, said chamber being open at two opposite ends, a flexible sleeve positioned within said chamber and extending over the ends of said body, a plurality of contact elements secured through the wall of said sleeve to permit communication through said wall at selected points along the length of said sleeve, each of said contact elements being cylindrical in form and provided with an aperture and a concave inner face, a plurality of pressure-potential taps secured through the walls of said body to said contact elements, each of said taps having an electrically insulated conduit leading to a contact element, a first closure member secured to said body at one end of said chamber, said first closure member having means providing at least one electrically insulated conduit into said chamber, and a second closure member secured to said body at the other end of said chamber, said second closure member having means providing at least one conduit into said chamber.

8. Apparatus of the character described comprising a body provided with a chamber adapted to hold a sample of porous material and having a conduit leading to the inner wall of said chamber, said chamber being open at two opposite ends, a flexible sleeve positioned within said chamber and extending over the ends of said body, a plurality of contact elements secured through the wall of said sleeve to permit communication through said wall at selected points along the length of said sleeve, each of said contact elements having an arcuate portion provided with a channel extending around a segment of the inner wall of said sleeve and a port connecting with said channel and opening through the outer wall of said sleeve, a plurality of pressure-potential taps secured through the walls of said body to said contact elements, each of said taps having an electrically insulated conduit leading to a contact element, a first closure member secured to said body at one end of said chamber, said first closure member having means providing at least one electrically insulated conduit into said chamber, and a second closure member secured to said body at the other end of said chamber, said second closure member having means providing at least one conduit into said chamber.

9. Apparatus of the character described comprising a body provided with a chamber adapted to hold a sample of porous material and having a conduit leading to the inner wall of said chamber, said chamber having two open opposite ends, a flexible sleeve positioned within said chamber and extending over the ends of said body, a plurality of contact elements secured through the wall of said sleeve to permit communication through said wall at selected points along the length of said sleeve, a plurality of pressure-potential taps secured through the walls of said body to said contact elements, each of said taps having an electrically insulated conduit leading to a contact element, means secured to each of said taps for connecting electrical and fluid pressure measuring means thereto, a first closure assembly secured to one end of said body and fitting within said sleeve at one end of said chamber, said first closure assembly having at least one electrically insulated conduit leading into said chamber, electrical lead connecting means secured to said conduit in said first closure assembly, a second closure assembly secured to the other end of said body, said second closure assembly including longitudinally adjustable means adapted to fit within said sleeve, said lonigtudinally adjustable means being provided with at least one conduit leading into said chamber, and electrical lead securing means connected to said second closure assembly.

10. Apparatus of the character described comprising a body provided with a chamber adapted to hold a sample of porous material and having a conduit leading to the inner wall of said chamber, said chamber having two open opposite ends, a flexible sleeve positioned within said chamber and extending over the ends of said body, a plurality of contact elements secured through the wall of said sleeve to permit communication through said wall at selected points along the length of said sleeve, each of said contact elements being cylindrical in form and provided with an aperture and a concave inner face, a plurality of pressure-potential taps secured through the walls of said body to said contact elements, each of said taps having an electrically insulated conduit leading to a contact element, means secured to each of said taps for connecting electrical and fluid pressure measuring means thereto, a first closure assembly secured to one end of said body and fitting within said sleeve at one end of said chamber, said first closure assembly having at least one electrically insulated conduit leading into said chamber, electrical lead connecting means secured to said conduit in said first closure assembly, a second closure assembly secured to the other end of said body, said second closure assembly including longitudinally adjustable means adapted to fit within said sleeve, said longitudinally adjustable means being provided with at least one conduit leading into said chamber, and electrical lead securing means connected to said second closure assembly.

11. Apparatus of the character described comprising a body provided with a chamber adapted to hold a sample of porous material and having a conduit leading to the inner wall of said chamber, said chamber having two open opposite ends, a flexible sleeve positioned within said chamber and extending over the ends of said body, a plurality of contact elements secured through the wall of said sleeve to permit communication through said wall at selected points along the length of said sleeve, each of said contact elements having an arcuate portion provided with a channel extending around a segment of the inner wall of said sleeve and a port connecting with said channel and opening through the outer wall of said sleeve, a plurality of pressure-potential taps secured through the walls of said body to said contact elements, each of said taps having an electrically insulated conduit leading to a contact element, means secured to each of said taps for connecting electrical and fluid pressure measuring means thereto, a first closure assembly secured to one end of said body and fitting within said sleeve at one end of said chamber, said first closure assembly having at least one electrically insulated conduit leading into said chamber, electrical lead connecting means secured to said conduit in said first closure assembly, a second closure assembly secured to the other end of said body, said second closure assembly including longitudinally adjustable means adapted to fit within said sleeve, said longitudinally adjustable means being provided with at least one conduit leading into said chamber, and electrical lead securing means connected to said second closure assembly.

12. Apparatus of the character described comprising in combination a body provided with a cylindrical chamber adapted to hold a sample of porous material, said chamber having two open opposite ends, said body having a conduit through a side wall thereof leading to said chamber, a flexible sleeve positioned within said chamber and extending over the ends of said chamber, a plurality of contact elements secured through the side wall of said sleeve and adapted to permit fluid and electrical communication through said wall at a plurality of selected points along the length of said sleeve, a plurality of pressure-potential taps positioned through the walls of said body and secured to said contact elements, each of said taps being provided with a tubular conduit electrically insulated from said body and leading to said contact elements to permit fluid and electrical communication through said taps to said contact elements, means on each of said taps for connecting thereto a fluid conduit and an electrical lead, a first closure assembly secured to said body at one end of said chamber and fitting within said sleeve, a conduit leading through said first closure assembly to said chamber, electrical insulating means positioned between said conduit and said first closure assembly, means on said conduit for securing an electrical lead thereto, a second closure assembly secured to said body at the other end of said chamber, said second closure assembly including a longitudinally adjustable plug fitting at one end into said sleeve, said plug having a plurality of conduits leading to said chamber, valve means secured within said conduits in said plug, and means on said plug for connecting an electrical lead thereto.

13. Apparatus of the character described comprising in combination a body provided with a cylindrical chamber adapted to hold a sample of porous material, said chamber having two open opposite ends, said body having a conduit through a side wall thereof leading to said chamber, a flexible sleeve positioned within said chamber and extending over the ends of said chamber, a plurality of contact elements secured through the side wall of said sleeve and adapted to permit fluid and electrical communication through said wall at a plurality of selected points along the length of said sleeve, each of said contact elements being cylindrical in form and provided with an aperture and a concave inner face, a plurality of pressure-potential taps positioned through the walls of said body and secured to said contact elements, each of said taps being provided with a tubular conduit electrically insulated from said body and leading to said contact elements to permit fluid and electrical communication through said taps to said contact elements, means on each of said taps for connecting thereto a fluid conduit and an electrical lead, a first closure assembly secured to said body at one end of said chamber and fitting within said sleeve, a conduit leading through said first closure assembly to said chamber, electrical insulating means positioned between said conduit and said first closure assembly, means on said conduit for securing an electrical lead thereto, a second closure assembly secured to said body at the other end of said chamber, said second closure assembly including a longitudinally adjustable plug fitting at one end into said sleeve, said plug having a plurality of conduits leading to said chamber, valve means secured within said conduits in said plug, and means on said plug for connecting an electrical lead thereto.

14. Apparatus of the character described comprising in combination a body provided with a cylindrical chamber adapted to hold a sample of porous material, said chamber having two open opposite ends, said body having a conduit through a side wall thereof leading to said chamber, a flexible sleeve positioned within said chamber and extending over the ends of said chamber, a plurality of contact elements secured through the side wall of said sleeve and adapted to permit fluid and electrical communication through said wall at a plurality of selected points along the length of said sleeve, each of said contact elements having an arcuate portion provided with a channel extending around a segment of the inner wall of said sleeve and a port connecting with said channel and opening through the outer wall of said sleeve, a plurality of pressure-potential taps positioned through the walls of said body and secured to said contact elements, each of said taps being provided with a tubular conduit electrically insulated from said body and leading to said contact elements to permit fluid and electrical communication through said taps to said contact elements, means on each of said taps for connecting thereto a fluid conduit and an electrical lead, a first closure assembly secured to said body at one end of said chamber and fitting within said sleeve, a conduit leading through said first closure assembly to said chamber, electrical insulating means positioned between said conduit and said first closure assembly, means on said conduit for securing an electrical lead thereto, a second closure assembly secured to said body at the other end of said chamber, said second closure assembly including a longitudinally adjustable plug fitting at one end into said sleeve, said plug having a plurality of conduits leading to said chamber, valve means secured within said conduits in said plug, and means on said plug for connecting an electrical lead thereto.

References Cited in the file of this patent

UNITED STATES PATENTS

| | | |
|---|---|---|
| 2,705,418 | Reichertz et al. | Apr. 5, 1955 |
| 2,745,057 | Dotson | May 8, 1956 |

FOREIGN PATENTS

| | | |
|---|---|---|
| 61,343 | Netherlands | July 15, 1948 |